United States Patent [19]

Oxenreider et al.

[11] 4,344,748

[45] Aug. 17, 1982

[54] APPARATUS FOR DEFORMING MOLDED BATTERY CASE

[75] Inventors: Terry Oxenreider, Wernersville; William J. Eberle, Reading, both of Pa.

[73] Assignee: General Battery Corporation, Reading, Pa.

[21] Appl. No.: 176,254

[22] Filed: Aug. 7, 1980

[51] Int. Cl.³ .............................................. B29C 24/00
[52] U.S. Cl. ................................... 425/143; 425/392; 425/403; 429/176; 429/186
[58] Field of Search ............... 425/143, 383, 403, 392; 429/176, 186

[56] References Cited

U.S. PATENT DOCUMENTS

| | | | |
|---|---|---|---|
| 2,552,043 | 5/1951 | Horvath | 425/403 X |
| 3,607,440 | 9/1971 | Daniel | 429/176 |
| 4,100,828 | 7/1978 | Thune | 83/1 |

Primary Examiner—Thomas P. Pavelko
Attorney, Agent, or Firm—Benasutti Associates, Ltd.

[57] ABSTRACT

An apparatus for modifying the between the ribs space in a thermal plastic battery container is disclosed. The apparatus comprises a heated non-circular wiping member which when rotated about a fixed centerline defines a first circumference having a diameter substantially equal in length to the minimum between the ribs space and a second concentric circumference having a diameter greater in length than the first diameter.

14 Claims, 6 Drawing Figures

APPARATUS FOR DEFORMING MOLDED BATTERY CASE

BACKGROUND OF THE INVENTION

1. Field of the Invention

The invention disclosed is useful in the manufacture of starting, lighting, and ignition storage batteries such as frequently found in automotive and recreational vehicles.

2. PRIOR ART

In the storage battery industry, there has frequently been recognized the need for a universal battery container having standard outside dimensions and internal flexibility which would permit varying electrical capacity. The industry in the past has met the need for varying electrical capacity by altering the number of negative and positive plates which are used to make up the elements of each cell of the battery. The number of cells which a particular battery container has is then cell multiple of the nominal voltage of the elements. Within a given battery size, there are a variety of electrical capacities available. In the higher capacity batteries the number of battery plates which make up the elements are greater per element. Conversely, the number of battery plates in element for a smaller capacity battery is less. Since the external dimensions of the batteries within a particular size class is standard within the industry, the battery manufacturer must adjust the cell area to receive either the thicker battery elements containing a larger number of plates or the thinner elements containing the lesser number of plates.

In the past this has been achieved in two ways. The first approach was to mold individual containers having different cell areas. The cell areas were modified by increasing or decreasing the size of a plurality of ribs disposed along the walls defining the cell. In this way a larger rib would be used for the smaller battery element and a smaller rib would permit accommodate of a larger battery element. A second approach was to add additional spacer members between the battery plates of a given element so that an element having lesser plates would be filled or expanded by the use of separators as sham plates.

A more recent development has been the use of a single battery container within a size classification which is modified to accommodate larger elements. The universal battery container has ribs which are molded to accommodate the smallest or thinnest element within a size classification. When it is desired to use the battery container for a battery having a larger electrical capacity and therefore thicker battery elements the ribs of the battery container are trimmed with a mechanical device to remove a portion of the rib and therefore open the volume of the cell. This technique while in advance over the prior art technique of using additional separators, still presents the problem of sophisticated mechanical equipment necessary to perform the trimming and the associated problem of removing the trimmings from the battery container.

The instant invention seeks to solve the problem of a universal battery container as well as the problems associated with trimming and scrap removal by providing an apparatus for thermally modifying the between the rib space in the cell. The apparatus may be used to modify the between the rib space in a single operation and does not require the removal of scrap from the battery container.

SUMMARY OF THE INVENTION

The disclosed invention is an apparatus for modifying the between the ribs space in a thermal plastic battery container which has been molded with a minimum between the ribs space. The apparatus comprises a heated non-circular wiping member which when rotated about a fixed centerline defines a first circumference having a diameter substantially equal in length to the minimum between the ribs space and a second concentric circumference having a diameter greater in length than the first diameter.

DESCRIPTION OF THE PREFERRED EMBODIMENT

A preferred embodiment of the invention will now be described in detail with reference to the attached figures, wherein like numerals indicate like elements in all views.

Figure 1:
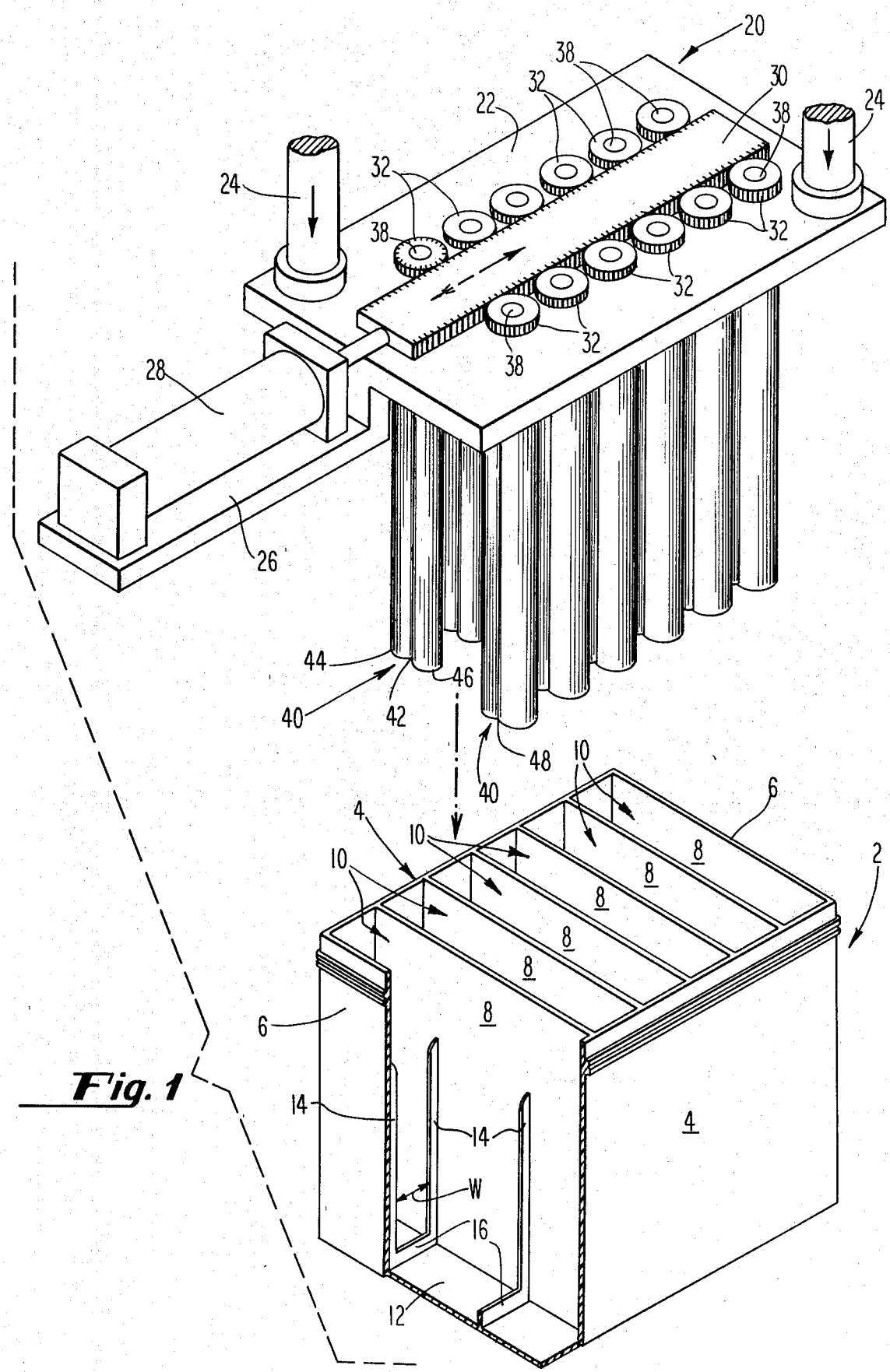
FIG. 1 is a perspective view of an apparatus according to the instant invention as it is disposed over a battery case prior to rib modification.

Referring now to FIG. 1, there is shown a battery container 2 whose external dimensions are defined by the side walls 4 and the perpendicular walls 6. Battery container 2, as illustrated, is a twelve volt battery case which will be familiar to those in the art. The interior of the battery container 2 has a plurality of parallel dividers, which are parallel to the perpendicular wall 6. The dividers divide the interior of the battery container 2 into 6 cells, as will be known in the art. The base 12 of the battery container 2 is illustrated as being flat or planar. However, variations in this base will be known to those in the art. Within each of the cells 10 there are a plurality of parallel ribs 14 which extend from an inner connecting bridge 16. The inner connecting bridge 16 is molded directly on base 12. The height of the ribs 14 from the bridge 16 will be determined by the height of the cell elements which are to be placed therein, as will be known in the art the height of the rib 14 may be varied. The between the ribs width "w" in the illustrated battery case is such that the smallest number of battery or the thinnest elements will fit snugly within the space "w". It is the enlargement of this space "w" or the "between the rib" space which is the ultimate goal of the instant invention. In a battery which is to have a larger number of battery plates or thicker element the ribs 14 are spaced to increase the between the space "w".

Also shown in FIG. 1 is the apparatus 20 which is one embodiment of the invention which has been especially designed to simultaneously modify the between the rib space in the six cells of a six cell twelve volt battery. The rib modification apparatus 20 generally comprises a template 22 in which there are positioned a plurality of apertures (not shown) through which a wiping member may be positioned. The template 22 is mounted by means of connecting rods 24 in a press or other similar device which permits the vertical movement of the entire apparatus 20. Adjacent template 22 there is a platform 26 on which there is mounted a drive cylinder 28. Drive cylinder 28 may be either hydraulic, pneumatic, or mechanical and is used to move the rack gear 30 reciprocally across template 22. Adjacent the rack gear 30 are a plurality of inner engaging gears 32. Note that the gears 32 upon movement of the rack 30 rotate in opposite directions on parallel sides of the rack 30.

Rib modification apparatus 20 has a plurality of wiping members 40, i.e. one wiping member 40 for each set of parallel ribs 14. The wiping members 40 are aligned in parallel rows which correspond to the cell locations of the ribs 14. Each of the wiping members 40 has a center line 42 and a cam portion 44 disposed on either side of the center line 42.

Figure 2:
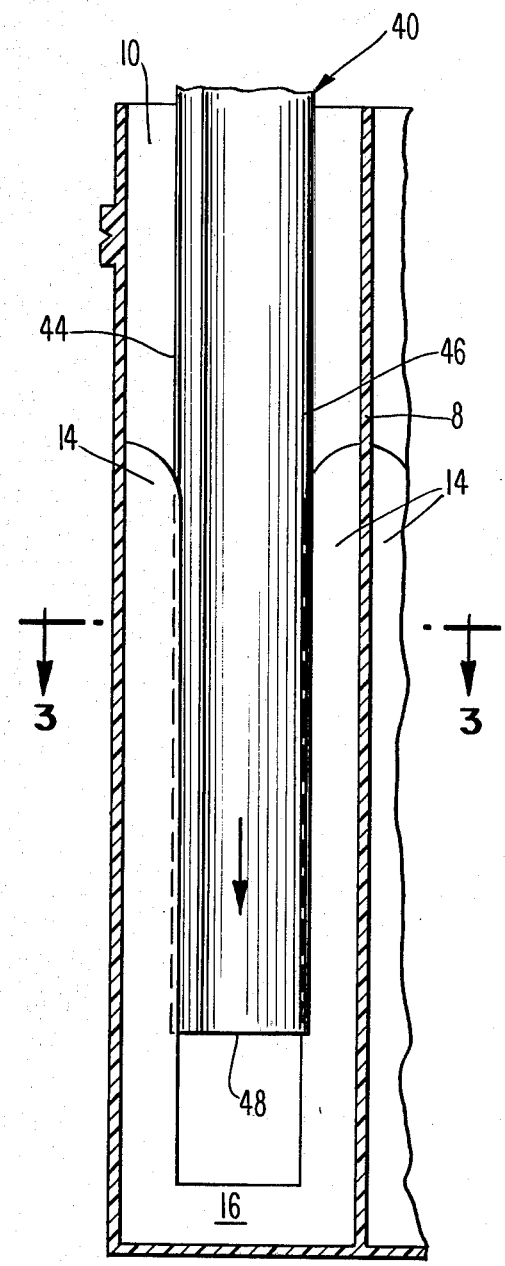
FIG. 2 is a sectional view of one cell of the battery case with the apparatus of the instant invention in a downward traveling stroke.

Referring now to FIG. 2, there is shown one wiping member 40 as it is entering a cell 10 between the ribs 14. The wiping member 40 is dimensioned such that its width at center line 42 is substantially the width of the between the rib space "w" for the thinnest battery element which is to be placed in the cell. As the wiping member 40 enters the cell the first cam portion 44 is disposed on one side of the parallel rib 14 and the second cam portion 46 is disposed on the other side of the second parallel rib 14. The wiping member 40 is moved vertically into the cell until the lower portion 48 thereof is in contact with the bridge 16.

Wiping member 40 is heated, as will be explained more fully herein with reference to FIG. 5, and will effect melting of the thermal plastic material of which the ribs 14 and the bridge 16 are molded thereof.

Figure 3:
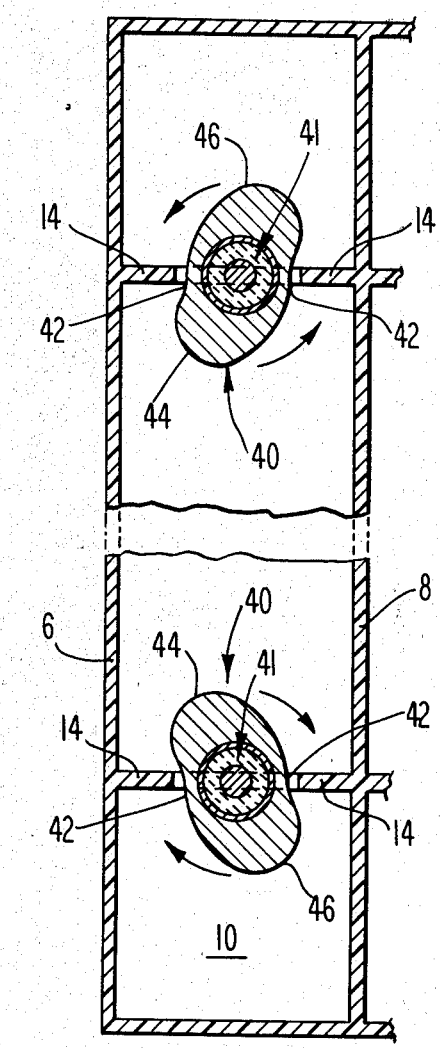
FIG. 3 is a sectional view taken through FIG. 2 at the line 3—3, showing the orientation of the instant apparatus within the battery case.
Figure 4:
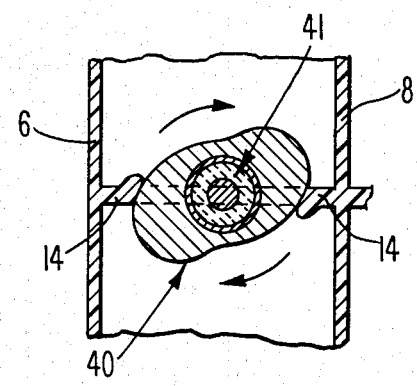
FIG. 4 is an isolated sectional view of the rib modification according to the instant invention.

Referring now to FIG. 3, the wiping members 40 have fully entered the cell 10. Due to the movement of rack gear 30, the wiping members 40 are rotated as shown in FIG. 3. The rotation of the cam lobes 44 and 46 bring the heated lobe into contact with the thermal plastic material and cause a melting deformation of that material. The deformation is shown in a sectional fragmentary view in FIG. 4. Note from FIG. 4 that the cam portions 44 and 46 need not be moved through their entire duration. By moving the cam portions 44 and 46 through a limited portion of their duration, it is possible to control the wiping action of the cam portions. Should it be desired to open the between the rib space "w" to its maximum, the cam portions may be rotated a full 180° whereby the ribs would be deformed to the maximum width of a cam lobe.

Figure 5:
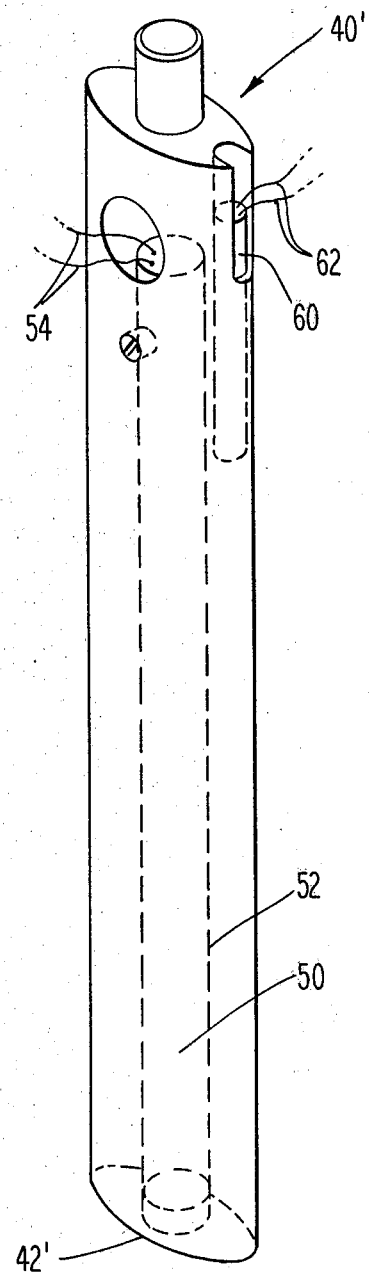
FIG. 5 shows a universal rib modification apparatus according to the instant invention.

Referring now to FIG. 5, there is shown a universal wiping member 40′. The wiping member 40′ is substantially identical to the wiping member 40, however, in this embodiment there has been no effort to shape or configure cam lobes on the wiping member. Wiping member 40 has a generally oval configuration wherein the width or minor axis of the oval about the center line 42′ is as previously described for the wiping member 40. However, the lobe portions do not incorporate the incremental shaping of the cam lobes 44 and 46. The major axis of the oval is substantially equal to the maximum desired between the ribs space, therefore, the wiping member 40′ would be most use in an operation where the ribs 14 are to be open to maximum width. The wiping member 40′ of FIG. 5 does show the connecting post 38 which is placed in the aperture through template 22 and is secured to gear 32. Connecting post 38 may be connected to gear 32 via a compression fit, a woodrift key, or any known means. Through the center of wiping member 40′ there is shown the heat cartridge which is used to heat the wiping members 40 and 40′. In the preferred embodiment heat cartridge 50 is a Watlow Firerod which will be known to those in the art and is available from Watlow 12001 Lackland Road, St. Louis, MO 63141. The cartridge is inserted through a longitudinal bore 52 in wiping member 40 or 40′. The heat cartridge 50 is connected to an electrical energy source by means of the lead wires 54 which exit through a connecting aperture 56. A recess 58 is formed in the area of aperture 56 of the wiping member 40 or 40′. A thermocouple 60 is located in recess 58 and the lead wires 62 are connected to a monotoring apparatus. Thermocouple 60 is a commercial thermocouple which is also available from Watlow.

Figure 6:
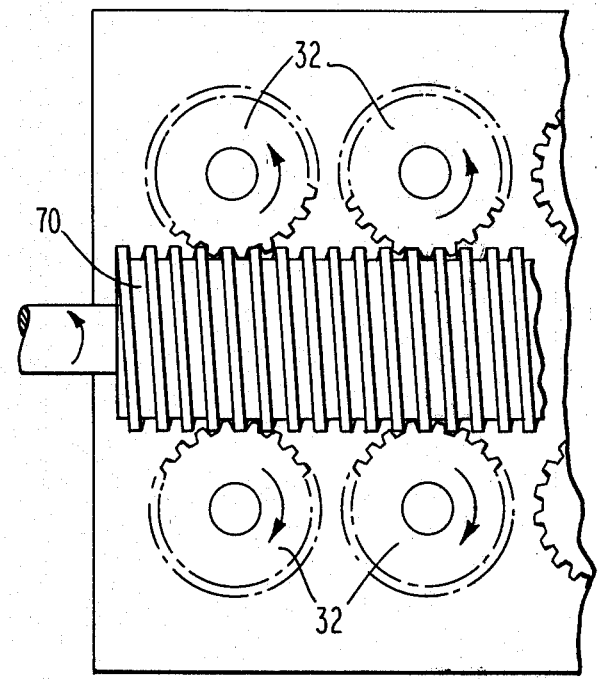
FIG. 6 is a fragmentary view of an alternative embodiment for driving the apparatus as is shown in FIG. 1.

Referring now to FIG. 6, there is shown an alternative embodiment of the drive means for the rib modifying apparatus 20. In the alternative embodiment the lead screw 70 is provided to drive the gears 32. The lead screw 70 may be driven by a printed circuit motor, not shown, which will be known to those in the art. The advantage of a printed circuit motor is that the amount of rotation of a lead screw 70 may be closely controlled through the use of the printed circuit motor.

Alternatively a wiping member could be mounted in a press or the like for individually modifying the between the ribs space for individual cells.

Having fully disclosed our invention, it is realized that variations may be made without departing from the spirit of our invention or the scope of the claims amended hereto.

We claim:

1. An apparatus for modifying the between the ribs space of a thermal plastic battery container, said apparatus comprising:
    a wiping member for modifying said ribs, said wiping member having a non-circular outer surface;
    means for positioning said wiping member within said battery container;
    heating means for heating said wiping member to a temperature sufficient for softening said thermal plastic; and
    means for rotating said wiping member.

2. The apparatus of claim 1 wherein said wiping member has a longitudinal bore for receiving said heating means.

3. The apparatus of claim 2 wherein, said heating means is a heat cartridge.

4. The apparatus of claim 3 wherein said apparatus further comprises:
    sensor means for detecting the temperature of said wiping member.

5. The apparatus of claim 4 wherein said sensor means is a thermocouple.

6. The apparatus of claim 1 wherein said wiping member has a generally oval configuration, the minor axis of said oval configuration having a length no greater than the minimum between the ribs space.

7. The apparatus of claim 6 wherein said oval configuration has a major axis having a length substantially equal to the maximum between the ribs space.

8. An apparatus for modifying the between the ribs space of a battery container, said container having at least two opposed walls defining in part a cell compartment and a plurality of ribs extending outwardly from said walls in a paired opposed relationship, said apparatus comprising:

a frame, a plurality of wiping members, at least equal in number to said paired opposed ribs in said cell compartment, each of said wiping members having a non-circular outer configuration, mounted on said frame;

means for vertically positioning said frame such that said plurality of wiping members are disposed between said opposed ribs;

heating means for heating said wiping members to a temperature sufficient for softening said ribs; and means for rotating said wiping members for modifying the between the ribs space.

9. The apparatus of claim 8 wherein each of said wiper members has a generally oval configuration, the minor axis of said oval configuration having a length no greater than the minimum between the rib space.

10. The apparatus of claim 9 wherein said oval configuration has a major axis having a length substantially equal to the maximum between the rib space.

11. The apparatus of claim 8 wherein each of said wiping members has a longitudinal base for receiving said heating means.

12. The apparatus of claim 11 wherein said heating means is a heat cartridge.

13. The apparatus of claim 12 wherein said apparatus further comprises a sensor for detecting the temperature of said wiping member.

14. The apparatus of claim 13 wherein said sensor is a thermocouple.

* * * * *